UNITED STATES PATENT OFFICE.

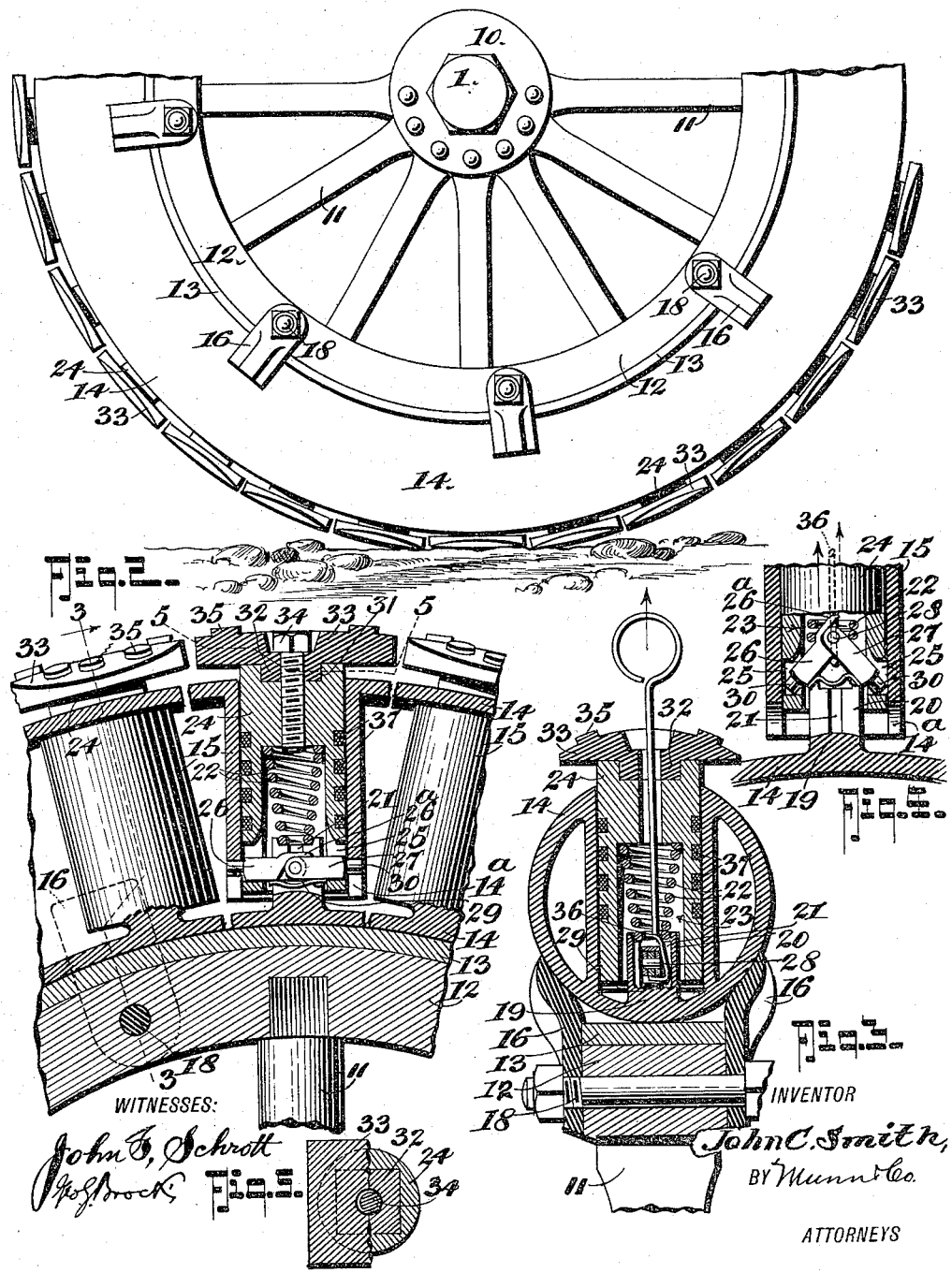

JOHN CALVIN SMITH, OF MOBILE, ALABAMA, ASSIGNOR OF TWENTY-FOUR ONE-HUNDREDTHS TO CHARLES W. HEAD AND TWENTY-FIVE ONE-HUNDREDTHS TO BRUNO GARCIA, BOTH OF MOBILE, ALABAMA.

VEHICLE-WHEEL.

1,176,493. Specification of Letters Patent. Patented Mar. 21, 1916.

Application filed April 9, 1915. Serial No. 20,159.

*To all whom it may concern:*

Be it known that I, JOHN C. SMITH, a citizen of the United States, and a resident of Mobile, in the county of Mobile and State of Alabama, have invented a certain new and useful Improvement in Vehicle-Wheels, of which the following is a specification.

My invention relates to improvements in vehicle wheels and more particularly to wheels designed to be used on automobiles and heavy trucks, the object being to provide a wheel which shall have positive traction and be cushioned to utilize the benefits of pneumatic tires without the danger of puncture, or to use spring pressure, or combined pneumatic and spring pressure.

With this and other objects in view my invention consists in a vehicle wheel containing a fluid under pressure, a series of open sockets around the periphery thereof, of plungers mounted in said sockets and acted upon by the fluid pressure, and spring actuated means for detachably securing the plungers in the sockets; my invention consists further in a vehicle wheel comprising a metal tube containing a fluid under pressure, a series of open sockets around its periphery, air tight pistons mounted in said sockets, independent segments carried by the outer ends of said pistons, said pistons acted on at their inner ends by fluid pressure, and spring means for locking the pistons in the sockets and limiting the play of said pistons; my invention consists further in certain novel features of construction and arrangement of parts as will be hereinafter more fully set forth and pointed out in the claims, reference being had to the accompanying drawings in which:—

Figure 1 is a side elevation of the lower portion of a wheel embodying my invention of a cushion tire having a pneumatic tread. Fig. 2 is a detail view of a portion of said wheel showing in section one of the sockets and its contained piston member. Fig. 3 is a cross section on line 3—3 of Fig. 2 showing piston holding latch and method of disengaging same. Fig. 4 is a fragmentary detail section showing method of removing piston from its cylinder after unlatching same. Fig. 5 is a cross section on line 5—5 of Fig. 2.

In the practical embodiment of my invention I use a wheel of the type known as military or artillery wheels having a hub 10, hub cap 1, wooden spokes 11, wooden felly 12 and steel tire 13, all of which are of the usual or conventional construction: upon the circumference of the wheel as just set forth I mount the steel tube 14 of high tensile strength and provide this tube with a large number of inwardly extending cylindrical tubes 15 open at both ends and preferably integral with the outer wall of the tube, thus forming a series of sockets around the periphery of the wheel: this tube 14 is held on the wheel proper by the clamps 16 bolted to the felly at as many points by the bolts 18 as may be necessary to maintain the tube 14 on the wheel and against side or transverse movement. Projecting from the inner wall of the tube and within the tube and projecting centrally into each tubular socket is a lug or stud 19 which has its outer portion cut out to form spaced apart ears 20 having in their inner faces the vertical grooves or channels 21, the function of which will be hereinafter more fully set forth: the outer portion of the lug 19 also forms a seat or bearing for the inner end of a coil spring 22 the outer end of which being larger than the inner end and bearing within a pocket 23 in the rear of piston 24 which is mounted to have an up and down motion in the cylindrical tubes 15: near the inner or open end of the pocket in the piston the walls at the sides are provided with diametrically oppositely disposed openings 25 through which the ends of a two part bolt latch project: this latch as seen in the present embodiment of my invention consists of two bolts or latch members 26 and 27 connected at their ends by a rule or knuckle joint the member 26 having an extension 26ª which extends over and beyond the pivot 28 of the latch members which will permit of the joint being broken outwardly but prevents such being done inwardly and holds the two members in a locked position being aided by the spring 29 secured at one end to member 27 and bearing at its other end against the inner face of the member 26: the ends 30 of the latch bolt are reduced and rounded to project through the slots 14ª at the inner ends of the sockets the outer ends of said slots being rounded to receive and hold the ends of the bolt, as shown in Fig. 2. The outer ends of the pistons 24, have a square mortise 31 therein in which is fitted a square stud or lug 32 projecting from the inner face of the steel tread member or segment 33 said lug having a central threaded opening into which screws the bolt 34, the head of which fits in a countersink in the outer face of the tread segment, the bolt passing through the stud 32 and screwing into the piston securing the tread portion rigidly to the piston: the outer face of the independent segmental treads is provided with numerous teats or projections 35 to prevent skidding.

To remove one of the tread segments, a tool comprising a shank, a handle on one end and a hook on the other is used as shown in Fig. 3: the bolt 34 is first removed, then the hook end of the tool is passed down through the opening and inside the coil spring, and being guided in the grooves 21 in lug 19 the hook 36 caught under the pivot of the double latch; an outward pull on the tool breaks the joint of the latch and the ends 30 are withdrawn from the slots 14ª into the bore of the socket, whereupon the entire piston and segmental tread can be easily removed from its socket; in replacing a segment this operation is reversed, and when the inner ends of the bolts reach the slots they will be forced into the same by the spring, thus locking the piston in place. The piston is provided with suitable packing rings 37 to insure a snug and air tight sliding fit of the pistons in the sockets and centering them.

The metal tube 14 is filled with a fluid preferably air under compression of about 125 pounds to the square inch: this pressure would tend to force the pistons out of their sockets, but this is prevented by the latch bolts which projecting through the opposite openings in the side walls of the piston sockets are limited in outward movement by the outer walls of the slots 14ª: the compressed fluid in the tube 14 gives a cushion to the pistons and the segments carried at their outer ends and this cushioning is aided by the coil springs; in fact should the compressed fluid escape from the tube the springs would be sufficient to give the desired cushioning; and also if a spring should break the compressed fluid would still continue to give the cushioning effect: thus the segments are given a combined fluid and spring cushion.

My invention does away with the rubber tubes used in pneumatic tires, which are both expensive and liable to damage, and still affords means to take up jolt and shock in passing over rough surfaces.

I claim:

1. In a vehicle wheel, an annular tube adapted to contain a fluid under pressure, a series of open ended cylinders extending radially within the tube in combination with air tight pistons moving in said cylinders, guideways in said cylinders, and a foldable latch carried by each of the pistons and adapted to engage the guideways and retain and limit the movement of the pistons within the cylinders.

2. In a vehicle wheel, an annular tubular member containing a fluid under pressure, a series of radial cylinders projecting therein, in combination with a series of independent tread segments having stems fitting air tight in said cylinders, and a spring controlled latch mechanism carried by each of the said stems to retain the same within the cylinders.

3. In a vehicle wheel, an annular chamber adapted to contain a fluid under pressure, and having a series of open ended radial sockets communicating with the interior of the annular chamber, in combination a series of air tight pistons moving in said sockets, tread segments detachably secured to the outer ends of said pistons, and spring actuated means for limiting the movement of the pistons in their sockets.

4. In a vehicle wheel, an annular metal tube adapted to contain a fluid under pressure, a series of open ended cylinders extending radially within the tube, in combination with air tight pistons moving in said cylinders, a latch carried by each of said pistons to engage the cylinders and limit motion therein, and a spring interposed between the pistons and the latches.

5. In a vehicle wheel, an annular metal tube adapted to contain a fluid under pressure, a series of cylindrical sockets extending radially into the tube, in combination with air tight pistons moving in said sockets and having cylindrical extensions provided with openings adjacent their inner ends, and forming a pocket, a spring controlled latch mechanism within each pocket and adapted to pass through said openings and engaging the walls of the cylindrical sockets.

6. In a vehicle wheel, an annular metal tube adapted to contain a fluid under pressure, a series of open cylinders extending radially therein, in combination with a series of air tight pistons moving in said cylinders, guideways in said cylinders, and a foldable latch mechanism at the inner end of each of the pistons adapted to engage the guides in the cylinders to limit the play of the pistons.

7. In a vehicle wheel, an annular metal tube adapted to contain a fluid under pressure, a series of cylindrical sockets extending radially into said tube, and having guides at their inner ends, in combination with a series of independent air tight pistons moving in said sockets, and a latch mechanism carried by each of said pistons to engage the guides, said latch mechanism consisting of a pair of bolts pivotally connected at their ends, one bolt having a prolongation extending over the pivot and upon the other bolt, and a spring attached to the inner face of one bolt and bearing against the under-face of the other bolt beyond the pivot of the latch.

8. In a vehicle wheel, an annular metal tube, adapted to contain a fluid under pressure, a series of cylinders extending radially therein, a lug or stud projecting from the inner wall of the tube, said lug having spaced apart ears provided with grooves or channels in their inner faces, in combination with a series of air tight pistons moving in said cylinders and having a pocket at their inner end, a spring carried in said pocket and bearing against the outer end of the aforesaid lug, a foldable latch carried by each of said pistons and comprising a pair of bolt members connected by a break joint and a spring to force said bolt members into operative position, and means for breaking said joint to withdraw the bolt members from the cylinders and permit the removal of the pistons therefrom.

JOHN CALVIN SMITH.

Copies of this patent may be obtained for five cents each, by addressing the "Commissioner of Patents, Washington, D. C."